June 2, 1953     M. P. WINTHER     2,640,941
EDDY CURRENT MECHANISM
Filed Jan. 18, 1951     2 Sheets-Sheet 1
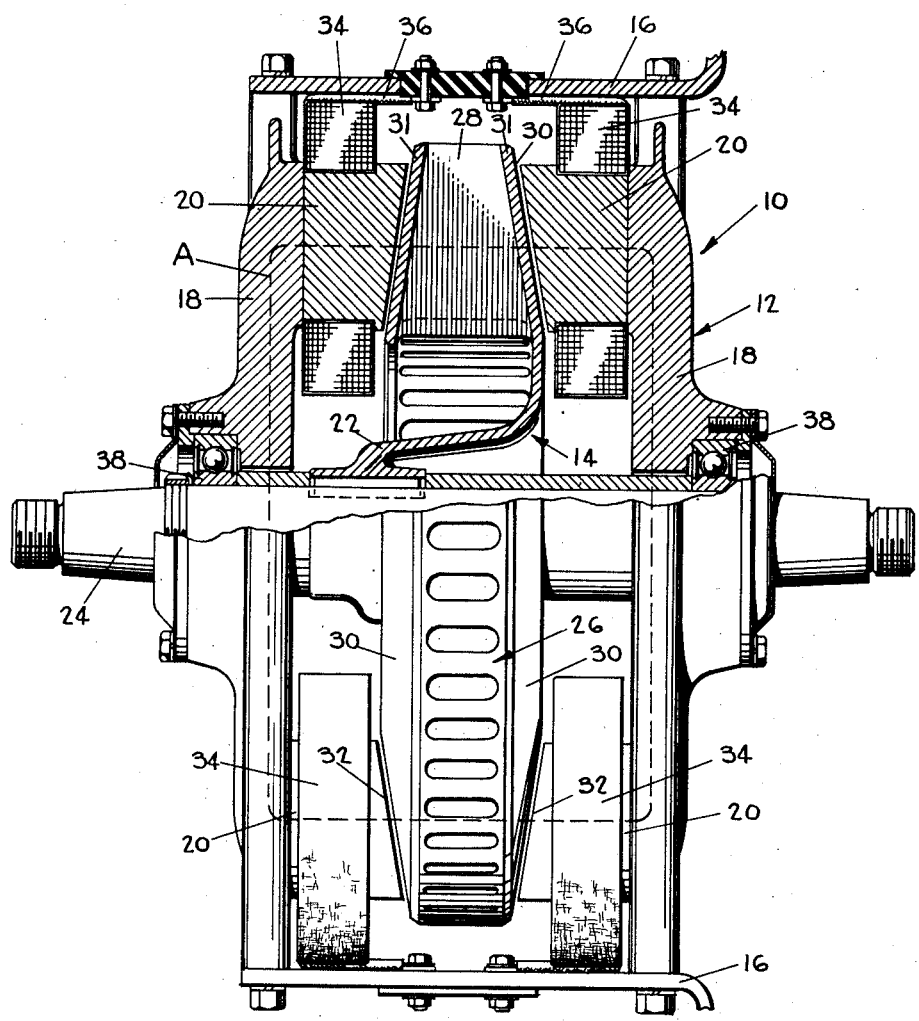
FIG_1
INVENTOR.
MARTIN P. WINTHER
BY
ATTORNEYS June 2, 1953  M. P. WINTHER  2,640,941
EDDY CURRENT MECHANISM
Filed Jan. 18, 1951  2 Sheets-Sheet 2
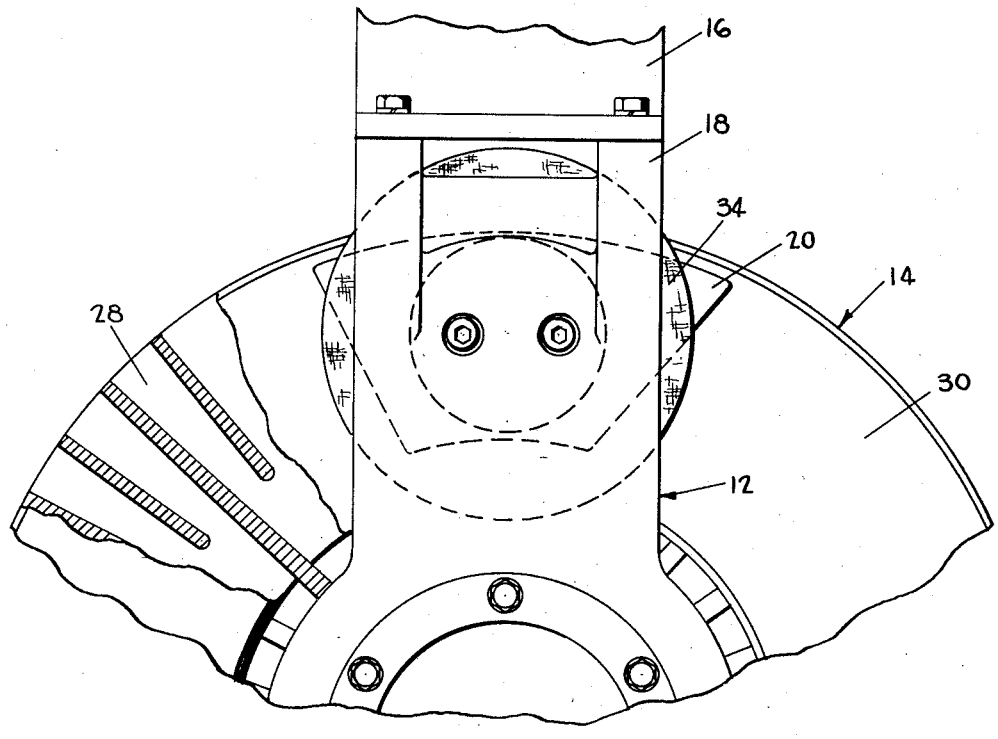
FIG_2
INVENTOR.
MARTIN P. WINTHER
BY
ATTORNEYS Patented June 2, 1953

2,640,941

UNITED STATES PATENT OFFICE 2,640,941

EDDY CURRENT MECHANISM

Martin P. Winther, Gates Mills, Ohio, assignor, by mesne assignments, to Eaton Manufacturing Company, Cleveland, Ohio, a corporation of Ohio Application January 18, 1951, Serial No. 206,642

8 Claims. (Cl. 310—93)

This invention relates to braking and more particularly to the utilization of eddy current electromagnetic mechanism for breaking or retarding purposes.

Broadly the invention comprehends the provision of an eddy current electromagnetic mechanism, primarily for use in retarding the motion of the propeller or like output shaft of a heavy duty vehicle.

Among the objects of the invention is the provision of an eddy current mechanism vehicle retarder that it comparatively simple and economical of construction, that provides a large braking area, that quickly and effectively dissipates heat generated therein during a braking or retarding operation; that has a high horsepower braking capacity for a given size, that provides for complete exposure of the rotor thereof to the atmosphere and wherein the rotor has tapered radial air passages therethrough for effectively cooling the rotor during its operation; and that is effective and smooth in the retardation of heavy loads imposed thereon.

Other objects and advantages of the invention will appear from the following description taken in connection with the drawings forming a part of the specification; and in which:

Fig. 1 is a side elevation and partially cross-sectionalized view of an eddy current braking mechanism; and Fig. 2 is a fragmentary partially cross-sectionalized end elevation view of the mechanism of Fig. 1.

Similar reference characters indicate corresponding parts throughout the several views of the drawings.

This eddy current mechanism was devised principally for the purpose of providing means for effectively and smoothly braking or at least retarding the motion of heavy duty vehicles to which it is applicable. As a requisite to providing effective braking the mechanism was so designed as to permit of the quick and effective cooling of the rotor thereof for the purpose of dissipating heat to be generated therein during its operation wherein high torque was absorbed thereby. This was accomplished by providing a rotor having a plurality of circumferentially spaced radially extended tapered air passages therein and oppositely disposed annular braking surfaces, said surfaces in turn being cooperative with sets of circumferentially spaced opposite polarity pole members forming a part of the stator of the mechanism, one member being disposed in close spaced proximity to one of the surfaces of the rotor. By so arranging the pole members and through the provision of the air passages in the rotor, the major portions of the braking surfaces of the rotor are exposed to the atmosphere and air can be easily circulated through the air passages in the rotor to effect a cooling thereof as may be required.

Referring to the drawings for more specific details 10 represents generally an eddy current braking mechanism comprising basically a stator 12 and a rotor 14.

The stator 12, which is adapted to be held stationary, includes mounting brackets 16, a pair of axially spaced end plates or straps 18, and a pair of circumferentially spaced sets of magnetic material pole members 20. The pole members 20 are in pairs of opposite polarity, the purpose of which will hereinafter appear.

The rotor 14 of magnetic material which is integral in structure, includes a hub flange 22 splined to a propeller or output shaft 24 of a vehicle, not shown, and a main body portion 26 having a plurality of circumferentially spaced radially extended tapered air passages 28 and presenting a pair of axially spaced and oppositely disposed annular braking surfaces 30. In so tapering the air passages 28 whereby a greater cross-sectional area is had at the ends nearer the axis of the rotor than the outer peripheral ends thereof an effective fan structure is provided in the rotor capable of passing a desired volume of cooling air radially through the passages.

With the air passages 28 so tapered the annular braking surfaces 30 are disposed angularly radially outwardly toward one another inasmuch as the end annular wall portions 31 of the rotor of which they form a part are of substantially uniform thickness. The thickness of wall portions 31 need only be of an amount sufficient to sustain rigidity of the rotor and afford ample strength to resist fracture thereof such that an efficient dissipation of the heat generated therein can be had through air passage across surfaces 30 and through passages 28.

The faces 32 of pole members 20 are complementary in angularity to and spaced apart from the respective faces 30 of the rotor by a predetermined amount, whereby an effective flow of eddy currents is had between the opposite polarity axially spaced pole members by way of the rotor 14 effective to retard the rotor in its rotation relative to the stator.

An annular coil 34 is arranged upon each and every one of the pole members for inducing upon energization thereof a circuitous magnetic flux field "A" between the pole members by way of the rotor and the straps 18. The coils 34 are supplied energizing current from an electrical power source, not shown, by way of electrical leads 36 connected to the coils.

In addition to being angularly disposed to the braking surface of the rotor, the face of each pole member is of a shape as shown by Fig. 2 such that between each set of pole members, during any phase of relative rotation between the rotor and stator, a constant flux flow area of the rotor is presented, taking into consideration the cross-sectional area of the ribbing 33 separating the air passages 28. Furthermore the area of the pole face is of a predetermined proportionate amount compared to the cross-sectional area of the portion of the pole member upon which the coil is arranged taken in a plane passing perpendicular to the axis of the coil to thus permit of an effective passage of eddy currents between the rotor and pole members for a high torque capacity absorption of the mechanism.

The shaft 24 is journalled for rotation in bearings 38 mounted in the respective end plates 18, forming a part of the stator.

As shown by Fig. 2 the end plates or straps 18 are only of sufficient width as to properly support the pole members thereon, thus permitting of the almost complete exposure of the rotor to the atmosphere especially in view of the relative face area of the pole members to the area of the annular braking surfaces such that air can freely circulate around the rotor and through the air passages 28 therein to effectively dissipate any heat that is generated in the rotor during a braking or retarding operation of the shaft 24 and the apparatus driven thereby.

Although solely two sets of pole members are disclosed in the structure defined herein, any number of sets of pole members as may be required for an ample braking operation can be employed without departing from the basic premise of the invention.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. An eddy current electromagnetic mechanism comprising a rotor provided with a pair of axially spaced annular wall portions, each having an annular braking surface oppositely disposed to one another and converging radially outwardly toward one another, and having a plurality of air passages intermediate the wall portions, and a stator cooperable with the rotor including a plurality of sets of circumferentially spaced pair of opposite polarity magnetic pole members, the members of each set being axially spaced from one another on opposite sides of the rotor in predetermined spaced relation to the respective annular braking surfaces.

2. A mechanism according to claim 1 wherein each pole member has an electromagnetic coil arranged thereon.

3. A mechanism according to claim 1 wherein the air passages extend radially through the rotor.

4. A mechanism according to claim 1 wherein the pole members are supported on stationary straps.

5. A mechanism according to claim 1 wherein the face area of the pole members is a proportionately small part of the area of the annular braking surfaces.

6. An eddy current electromagnetic mechanism comprising a rotor provided with a pair of axially spaced annular wall portions, each having an annular braking surface oppositely disposed to one another, and a plurality of air passages extending radially through the rotor, tapering downwardly from the radial inward opening thereof to the radial outward opening thereof and a stator cooperable with the rotor including a plurality of sets of circumferentially spaced pair of opposite polarity magnetic pole members, the members of each set being axially spaced from one another on opposite sides of the rotor in predetermined spaced relation to the respective annular braking surfaces.

7. A mechanism according to claim 6 wherein the annular wall portions are substantially uniform in thickness, and the annular braking surfaces extend angularly radially outwardly toward one another.

8. A mechanism according to claim 7 wherein the faces of the pole members are arranged parallel to the annular braking surface with which they respectively are associated.

MARTIN P. WINTHER.

References Cited in the file of this patent

UNITED STATES PATENTS

| Number | Name | Date |
|---|---|---|
| 2,355,484 | Teker | Aug. 8, 1944 |
| 2,503,704 | Bessiere | Apr. 11, 1950 |

FOREIGN PATENTS

| Number | Country | Date |
|---|---|---|
| 505,647 | Germany | Aug. 22, 1930 |